Patented Dec. 5, 1922.

1,437,726

UNITED STATES PATENT OFFICE.

ROBIN BRUCE CROAD AND GEORGE EDWARD KNOWLES, OF LIVERPOOL, ENGLAND.

MANUFACTURE AND PRODUCTION OF TANNING AGENTS.

No Drawing.     Application filed March 24, 1922. Serial No. 546,508.

*To all whom it may concern:*

Be it known that we, ROBIN BRUCE CROAD and GEORGE EDWARD KNOWLES, subjects of the King of Great Britain and Ireland, both residing at Bull Lane, Aintree, Liverpool, in the county of Lancaster, England, have invented certain new and useful Improvements in the Manufacture and Production of Tanning Agents (for which I have made application in Great Britain January 3rd, 1921), of which the following is a specification.

This invention relates to improvements in, and in the manufacture and production of, tanning agents and it has for its object the production of improved tanning agents for the production of different kinds of leather.

We attain this end by condensing formaldehyde, its polymerization products and compounds which give rise to formaldehyde, with aromatic compounds containing hydroxy groups, using as a condensing agent an alkaline reacting substance, such as an oxide or hydroxide or carbonate or bicarbonate of an alkali metal or alkaline earth metal, ammonia or a salt of a strong base with a weak acid such as sodium acetate, the condensation being carried out at ordinary or increased pressures, the product being then sulfonated and the soluble product thus obtained partly neutralized as hereinafter stated.

For the production of tanning agents in accordance with this invention it is essential that at least two molecules of the aromatic compound aforesaid are condensed with one molecule of formaldehyde or an equivalent proportion of a compound giving rise to formaldehyde, a small percentage of a condensing agent as aforesaid being used to effect the condensation, the reaction product being sulfonated using one or two molecules of a sulfonating agent and subsequently partly neutralizing by means of an alkaline reacting substance.

The condensation products employed are as a rule too strongly acid to be used without neutralization of any free mineral acid where present, and also without partial neutralization of the sulfonic acid group or groups. In general the finished product should have an acidity so that 1 gramme of the product requires 1.0 to 1.4 ccs. normal sodium hydroxide for complete neutralization.

For partially neutralizing the sulfonated condensation products we prefer to use oxides, hydroxides, and carbonates of alkali and alkaline earth metals; ammonium hydroxide and ammonium carbonate. The tanning properties vary according to the base used for neutralization.

The following examples will serve to illustrate further the nature of this invention, which, however, is not confined to these examples.

*Examples.*

1. 2 molecules of mixed cresols (cresylic acid) and 1 molecule of 40% formaldehyde solution are mixed and 0.1 to 0.25 per cent of the weight of the cresol taken of sodium bicarbonate is added, the mixture is heated in an open vessel, the mass meanwhile being constantly stirred until the reaction mixture becomes a viscous insoluble mass which may involve heating up to say 150° C. in some cases. On cooling, the reaction product is sulfonated at about 60° to 100° C. with 1 to 2 molecules of sulfuric acid, the product is then diluted and partly neutralized with caustic soda so that 1 gramme of the product requires 1.1 ccs. normal caustic soda to completely neutralize same and has a specific gravity of about 60° Tw.

2. 2 molecules (216 grammes) of mixed cresols (cresylic acid) and 1 molecule (75 cubic centimeters) of a 40% solution of formaldehyde are mixed and 0.1 to 0.25 grs. of sodium bicarbonate are added, the mixture is then heated in an autoclave for 1 to 2 hours at a temperature of from 80° to 120° C. The resin like reaction product is freed from water and sulfonated by warming at from 60° to 100° C. with 1 molecule (98 grammes) of concentrated sulfuric acid, the soluble product is then diluted and partly neutralized with ammonia so that 1 gramme of the product requires 1.1 ccs. normal caustic soda to completely neutralize same and has a specific gravity of about 50° to 60° Tw.

The solutions of the products described in the foregoing examples give a blue coloration with ferric chloride and the cold aqueous and slightly alkaline solutions of which products upon the addition of an alcoholic solution of tetrachlorquinone give a brown red coloration which disappears on making acid and when made alkaline give a dirty brown coloration.

What we claim is:—

1. The process of producing soluble products suitable for use as tanning agents which consists in first producing a resinous and insoluble compound by condensing at a suitable pressure at least two molecules of an aromatic hydroxy body with one molecule of formaldehyde, using an alkaline reacting substance as a condensing agent and subsequently sulfonating with at least one molecule of a sulfonating agent and partly neutralizing.

2. The process of producing soluble products suitable for use as tanning agents which consists in first producing a resinous and insoluble compound by condensing at a suitable pressure at least two molecules of an aromatic hydroxy body with one molecule of a compound giving rise to formaldehyde, using an alkaline reacting substance as a condensing agent and subsequently sulfonating with at least one molecule of a sulfonating agent and partly neutralizing.

3. The process of producing soluble products suitable for use as tanning agents which consists in first producing a resinous and insoluble compound by condensing at least two molecules of mixed cresols with one molecule of formaldehyde, using sodium bicarbonate as a condensing agent, heating the mixture in a suitable vessel until a viscous insoluble mass is produced, freeing the resinous product from water and subsequently cooling and sulfonating with at least one molecule of sulfuric acid and diluting the product and partly neutralizing.

4. As new articles of manufacture condensation products of an aromatic body with formaldehyde, an alkaline reacting substance and a sulfonating agent, which new compounds when partially neutralized are highly viscous organic compounds containing at least one sulfonic acid group, are easily soluble in water, tan hides, give and intense slate blue coloration with ferric chloride solution, and the cold aqueous and slightly alkaline solution of which upon the addition of an alcoholic solution of tetrachlorquinone give a brown red coloration which disappears on making acid and when made alkaline give a dirty brown coloration.

ROBIN BRUCE CROAD.
GEORGE EDWARD KNOWLES.